(12) United States Patent
Chang et al.

(10) Patent No.: US 11,468,699 B2
(45) Date of Patent: Oct. 11, 2022

(54) ELECTRONIC DEVICE

(71) Applicant: InnoLux Corporation, Miao-Li County (TW)

(72) Inventors: Tao-Sheng Chang, Miao-Li County (TW); Hui-Ching Yang, Miao-Li County (TW); Te-Yu Lee, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 6 days.

(21) Appl. No.: 16/880,905

(22) Filed: May 21, 2020

(65) Prior Publication Data

US 2020/0410203 A1   Dec. 31, 2020

(30) Foreign Application Priority Data

Jun. 28, 2019  (CN) .......................... 201910577122.X (51) Int. Cl.
| | | |
|---|---|---|
| *G06V 40/13* | (2022.01) | |
| *G01J 1/44* | (2006.01) | |
| *G06V 40/12* | (2022.01) | |

(52) U.S. Cl.
CPC ............... *G06V 40/13* (2022.01); *G01J 1/44* (2013.01); *G06V 40/1365* (2022.01); *G01J 2001/446* (2013.01)

(58) Field of Classification Search
CPC ........... G06K 9/00013; G06K 9/00087; G06K 9/0004; G01J 1/44; G01J 2001/446; H04N 5/37452

See application file for complete search history.

(56) References Cited

U.S. PATENT DOCUMENTS

| | | | | |
|---|---|---|---|---|
| 2004/0164225 | A1* | 8/2004 | Baer ..................... | H04N 5/3597 250/208.1 |
| 2005/0104089 | A1* | 5/2005 | Engelmann ............ | H04N 5/365 257/204 |
| 2008/0094378 | A1* | 4/2008 | Mollov .................. | A61B 6/032 345/204 |
| 2008/0278459 | A1 | 11/2008 | Yamashita | |
| 2010/0238135 | A1* | 9/2010 | Brown ................... | H04N 5/374 345/175 |
| 2013/0222584 | A1* | 8/2013 | Aoki ....................... | H04N 7/18 348/143 |
| 2016/0266695 | A1 | 9/2016 | Bae | |
| 2018/0165498 | A1* | 6/2018 | Xie ...................... | G06K 9/0004 |
| 2021/0217793 | A1* | 7/2021 | Maruyama ........ | H01L 27/14603 |

* cited by examiner

*Primary Examiner* — Thanh Luu
*Assistant Examiner* — Monica T Taba
(74) *Attorney, Agent, or Firm* — Winston Hsu (57) ABSTRACT

An electronic device has a photosensitive element, a charge storage element, and a node. The photosensitive element generates a current in response to illumination thereon. The charge storage element is coupled to the photosensitive element and is used to store charge in response to the current generated by the photosensitive element. The signal reading circuit is coupled to the photosensitive element, and the node is coupled between the photosensitive element and the charge storage element. The charge storage element and the photosensitive element are coupled in series, and the node is coupled to an end of the signal reading circuit.

10 Claims, 7 Drawing Sheets

ELECTRONIC DEVICE

CROSS REFERENCE TO RELATED APPLICATION

This non-provisional application claims priority of China patent application No. 201910577122.X, filed on Jun. 28, 2019, included herein by reference in its entirety.

BACKGROUND OF THE DISCLOSURE

1. Field of the Disclosure

This disclosure relates to an electronic device, and more particularly to an electronic device that may be used as a fingerprint reader.

2. Description of the Prior Art

There are many fingerprint readers on the market today, which are often used for mobile phone user authentication, financial transactions, and other security applications. The sensing areas of many existing fingerprint readers are usually too small, so it is sometimes difficult to read the feature values of a fingerprint. Accordingly, it is difficult for the prior art fingerprint readers to compare the output signals thereof with the fingerprint data stored in the database, such that the failure rate of fingerprint recognition will be high. In addition, because the sensing areas of fingerprint readers are too small, the number of acquired features is usually insufficient, resulting in low safety and security.

SUMMARY OF THE DISCLOSURE

An embodiment of the present disclosure provides an electronic device that may be used as a fingerprint reader. The electronic device comprises a photosensitive element, a charge storage element, a signal reading circuit and a node. The photosensitive element is used to generate a current in response to light illumination. The charge storage element is coupled to the photosensitive element, and is used to store the charge due to the current generated by the photosensitive element. The signal reading circuit is coupled to the photosensitive element. The node is coupled between the photosensitive element and the charge storage element. The charge storage element is coupled in series with the photosensitive element. The node is further coupled to an end of the signal reading circuit.

These and other objectives of the present disclosure will no doubt become obvious to those of ordinary skill in the art after reading the following detailed description of the embodiment that is illustrated in the various figures and drawings.

DETAILED DESCRIPTION

The embodiments of the present invention are described below with specific examples. Those skilled in the art can easily understand other advantages and effects of the present disclosure from the content disclosed in this specification. The present disclosure can also be implemented or applied by other different specific embodiments, and various details in this specification can also be modified and changed for different viewpoints and applications without departing from the spirit of this creation.

Although the terms such as first, second, etc. may be used in the description and following claims to describe various elements in claims, these terms do not mean or represent the claimed elements follow a certain order and do not represent the order of one claimed element and another claimed element, or their manufacturing sequence. These terms are used to discriminate a claimed element with a denomination from another claimed element with the same denomination.

Figure 1A:
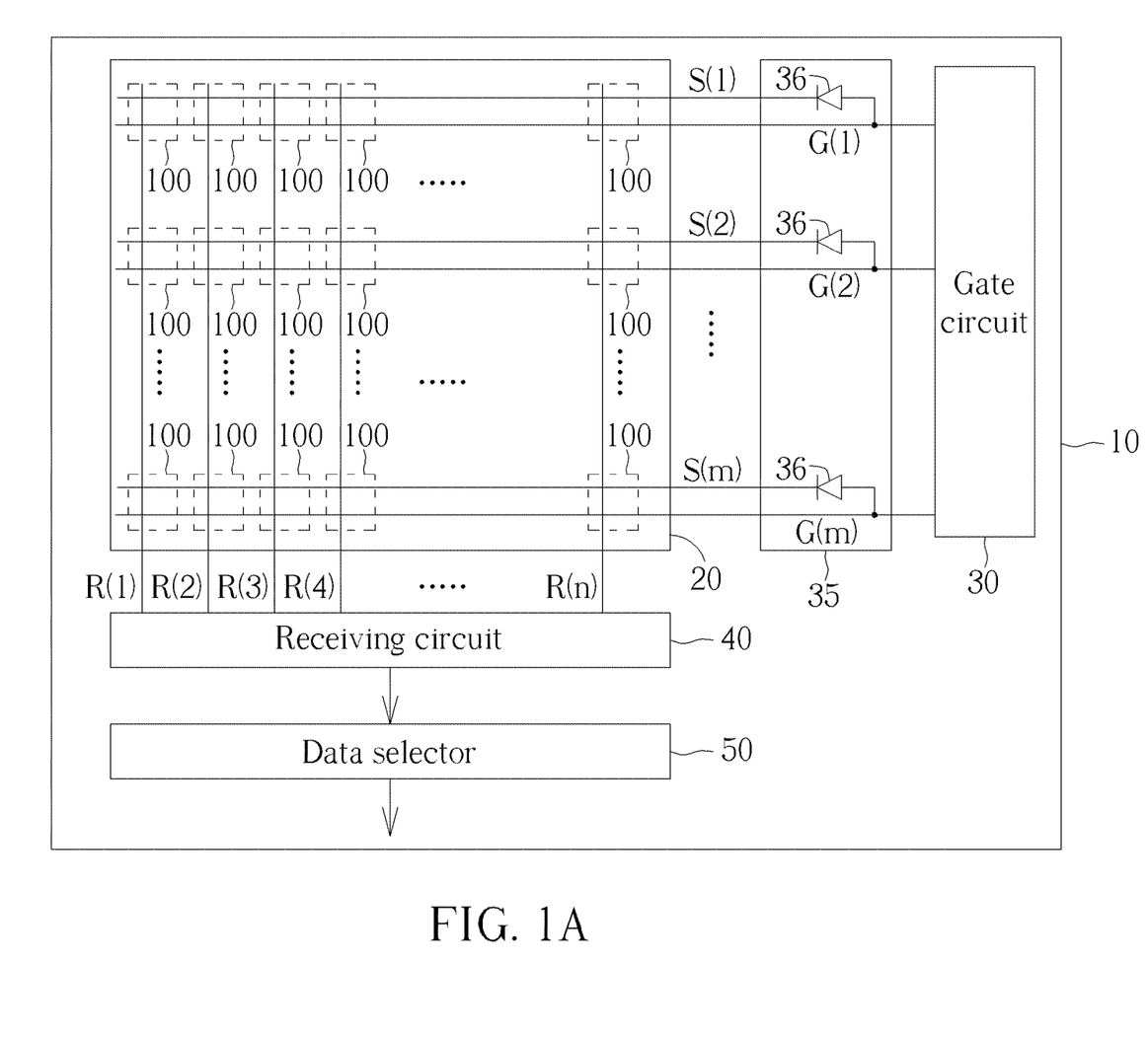
FIG. 1A is a schematic diagram of an electronic device according to the present disclosure.

FIG. 1A is a schematic diagram of an electronic device 10 according to an embodiment of the present disclosure. The electronic device 10 comprises a sensing unit array 20, a gate circuit 30, a receiving circuit 40, a data selector 50, a plurality of gate lines G(1) to G(m), a plurality of reset lines S(1) to S(m), and a plurality of data lines R(1) to R(n). The parameters m and n are positive integers greater than 1. In addition, the sensing unit array 20 comprises a plurality of sensing units 100 arranged in m rows and n columns. Each of the sensing units 100 is coupled to a corresponding gate line G(x), a reset line S(x), and a corresponding data line R(y). The parameters x and y are positive integers, $1 \leq x \leq m$, and $1 \leq y \leq n$.

Figure 1B:
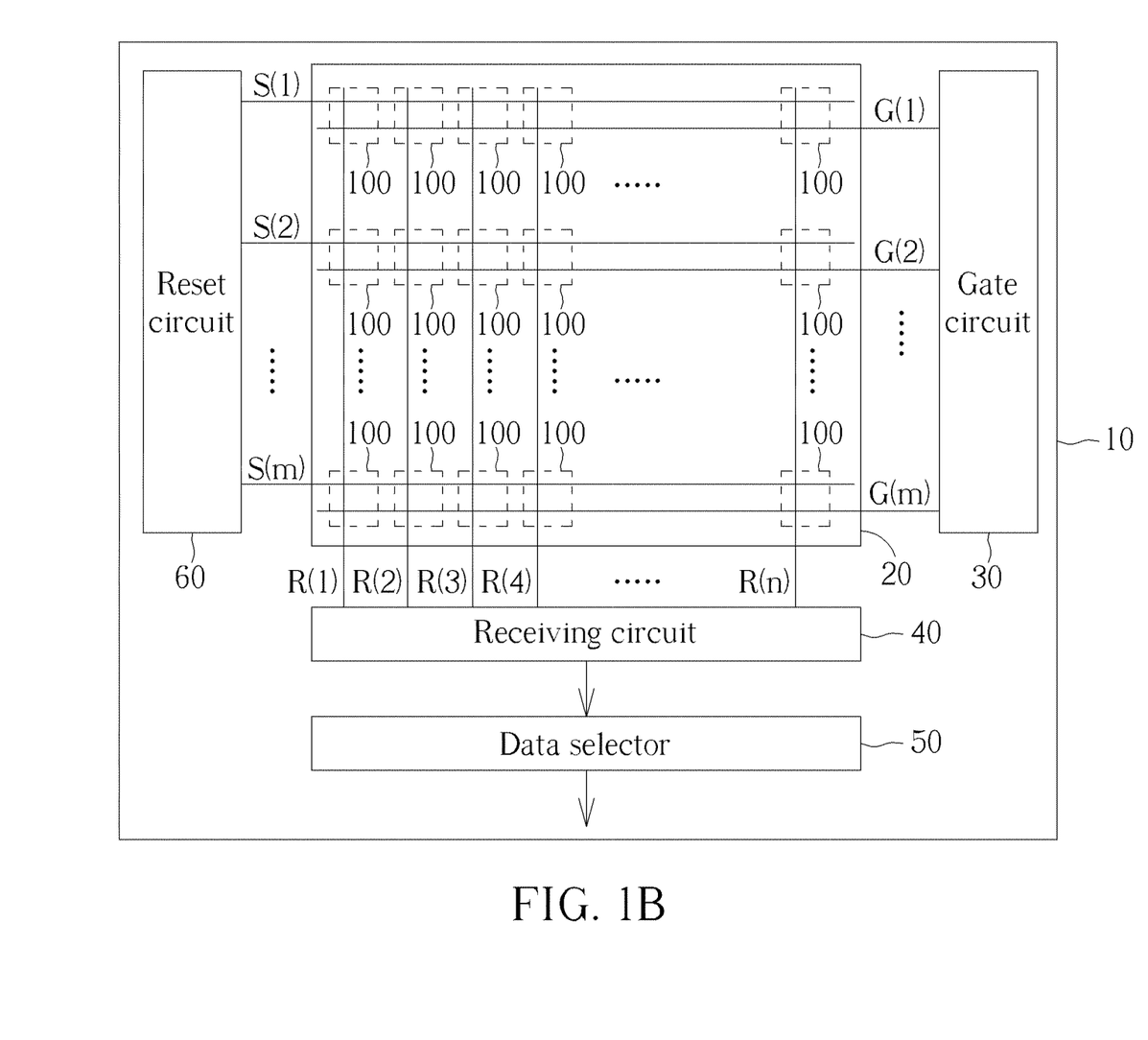
FIG. 1B is a schematic diagram of another electronic device according to the present disclosure.

The operations of the sensing unit 100 are controlled by gate signals and reset signals. The gate signals are transmitted from the gate circuit 30 to the sensing unit array 20 through the gate lines G(1) to G(m), and the reset signals are transmitted to the sensing unit array 20 through the reset lines S(1) to S(m). In some embodiments of the present disclosure, the phase of each reset signal is opposite to that of a corresponding gate signal. The source of the reset signals is shown in FIG. 1A. The gate signals are transmitted to the not-gate circuit 35 to be transformed to the reset signals with opposite phases. The not-gate circuit 35 may comprise a plurality of inverters 36, and each inverter 36 is used to invert a corresponding gate signal from a corresponding gate line to output a corresponding reset signal to a corresponding reset line. FIG. 1B is a schematic diagram of another electronic device 10 according to an embodiment of the present disclosure. In FIG. 1B, the reset signals may be generated by a reset circuit 60.

It should be noted that, the numbers and positions of the gate circuit 30, the not-gate circuit 35, and the reset circuit 60 of the electronic device 10 disclosed in the present disclosure are not limited to the numbers shown in FIGS. 1A and 1B.

Figure 2:
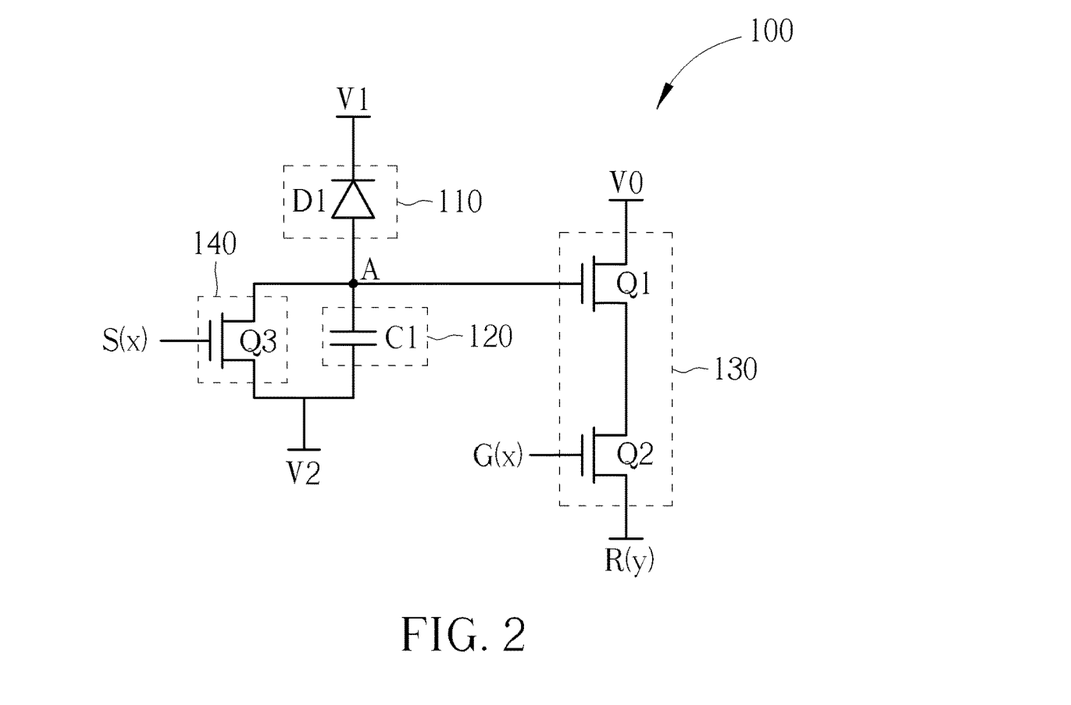
FIG. 2 is a circuit diagram of a sensing unit of the electronic device according to the present disclosure.
Figure 3:
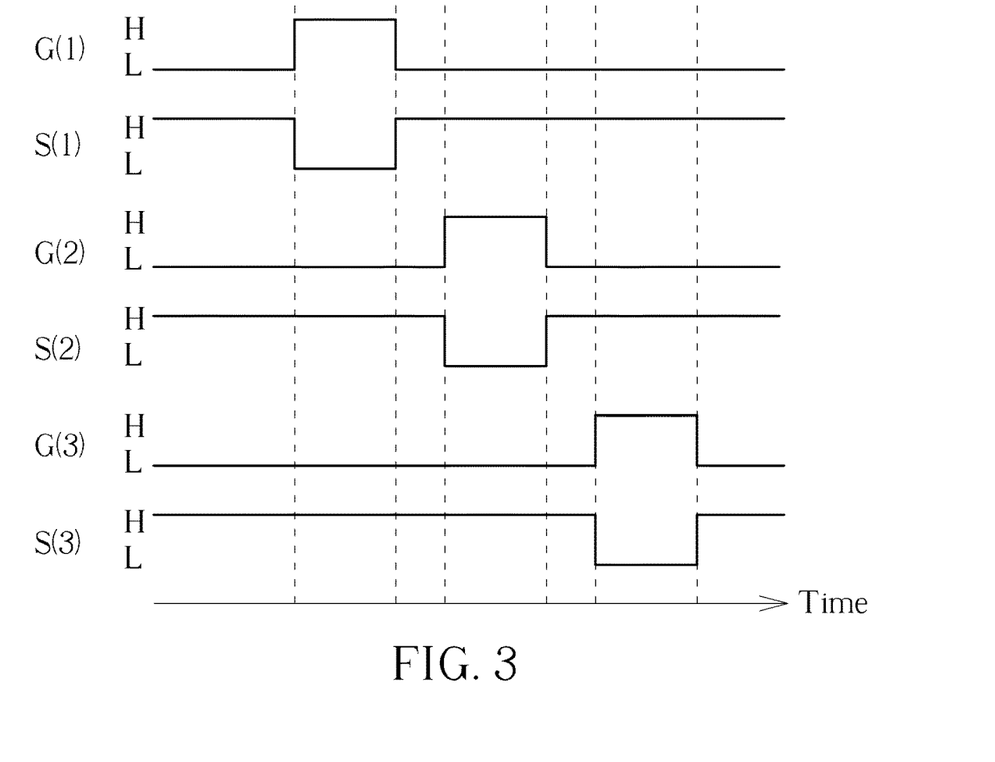
FIG. 3 is a timing diagram of signals received by the sensing unit in FIG. 2.

FIG. 2 is a circuit diagram of the sensing unit 100 of the electronic device 10. The sensing unit 100 generates a corresponding sensing signal according to the illumination thereon, and transmits the sensing signal to the receiving circuit 40 through a corresponding data line R(y). The receiving circuit 40 would determine the feature values of a measured fingerprint according to the sensing signals output by each sensing unit 100, and output the feature values of the measured fingerprint to the data selector 50. The data selector 50 may select a desired feature value from the feature values output by the receiving circuit 40 and then output the selected feature value. In this disclosure, for easy understanding, the symbols G(1) to G(m) are used to indicate not only the gate lines, but also the gate signals output by the gate circuit 30 to the corresponding gate lines. Similarly, the symbols R(1) to R(n) are used to indicate not only the data lines, but also the sensing signals output by the sensing unit 100 to the corresponding data lines. Similarly, the symbols S(1) to S(m) are used to indicate not only the reset lines, but also the reset signals transmitted by the reset lines. In the embodiment shown in FIG. 2, the phase of the reset signal S(x) is opposite to that of the gate signal G(x). That is, when the reset signal S(x) is at a positive voltage level, the gate signal G(x) is at a negative voltage level. When the reset signal S(x) is negative, the gate signal G(x) is positive. FIG. 3 is a timing diagram of signals received by the sensing unit 100 of the electronic device 10. As shown in FIG. 3, when the gate signals G(1), G(2), and G(3) are at a high voltage level, the corresponding reset signals S(1), S(2), and S(3) are at a low voltage level. When the gate signals G(1), G(2), G(3) are at the low voltage level, the corresponding reset signals S(1), S(2), and S(3) are at the high voltage level. The high voltage level may be a positive voltage, and the low voltage level may be a negative voltage.

Please refer to FIG. 2. In an embodiment of the present disclosure, the sensing unit 100 comprises a photosensitive element 110, a charge storage element 120, a signal reading circuit 130, and a node A. The sensing unit 100 may further comprise a reset element 140 for resetting the voltage level of the node A. The reset element 140 comprises a third switch Q3. In this embodiment, the third switch Q3 may be an N-type transistor, but the disclosure is not limited thereto. The gate of the third switch Q3 receives the reset signal S(x). In other words, the third switch Q3 is controlled by the reset signal S(x).

The node A is coupled between the third switch Q3, the photosensitive element 110, the charge storage element 120, and an end of the signal reading circuit 130. One end of the photosensitive element 110 is coupled to a bias voltage V1, and one end of the third switch Q3 is coupled to a bias voltage V2. The bias voltage V2 is less than the bias voltage V1 (i.e., V2<V1).

When the third switch Q3 is turned on by the reset signal S(x), the voltage level of node A is approximately equal to the bias voltage V2, so the photosensitive element 110 is reverse biased since the bias voltage V2 is less than the bias voltage V1. In other words, the bias voltage V1 coupled to the end of the photosensitive element 110 away from the node A is greater than the voltage level of the node A. The photosensitive element 110 may comprise a photodiode D1. When the photosensitive element 110 is reverse biased and illuminated, the photodiode D1 of the photosensitive element 110 generates a current flowing to node A.

The charge storage element 120 is coupled to the photosensitive element 110, and the charge storage element 120 is used in response to the current generated by the photosensitive element 110 to store a charge. The charge storage element 120 may comprise a capacitor C1.

The signal reading circuit 130 comprises a first switch Q1 and a second switch Q2. In the embodiment, the first switch Q1 and the second switch Q2 may be N-type transistors respectively, but this disclosure is not limited thereto. The gate of the first switch Q1 is coupled to the node A, an electrode of the first switch Q1 is coupled to a bias voltage V0, another electrode of the first switch Q1 is coupled to an electrode of the second switch Q2, another electrode of the second switch Q2 is coupled to a corresponding data line R(y), and the gate of the second switch Q2 receives the gate signal G(x). In the embodiment, since the reset signal S(x) and the gate signal G(x) are in antiphase, when the third switch Q3 is turned off, the second switch Q2 is turned on; and when the third switch Q3 is turned on, the second switch Q2 is turned off. When the third switch Q3 is turned off due to the reset signal S(x), the second switch Q2 of the signal reading circuit 130 is turned on, and the first switch Q1 is also turned on due to the voltage level of the node A. The charges stored by the charge storage element 120 would keep the first switch Q1 turned on. When both the first switch Q1 and the second switch Q2 are turned on, a current would flow from the bias voltage V0 through the signal reading circuit 130 as a sensing signal, and is transmitted to the receiving circuit 40 through the data line R(y).

Figure 4:
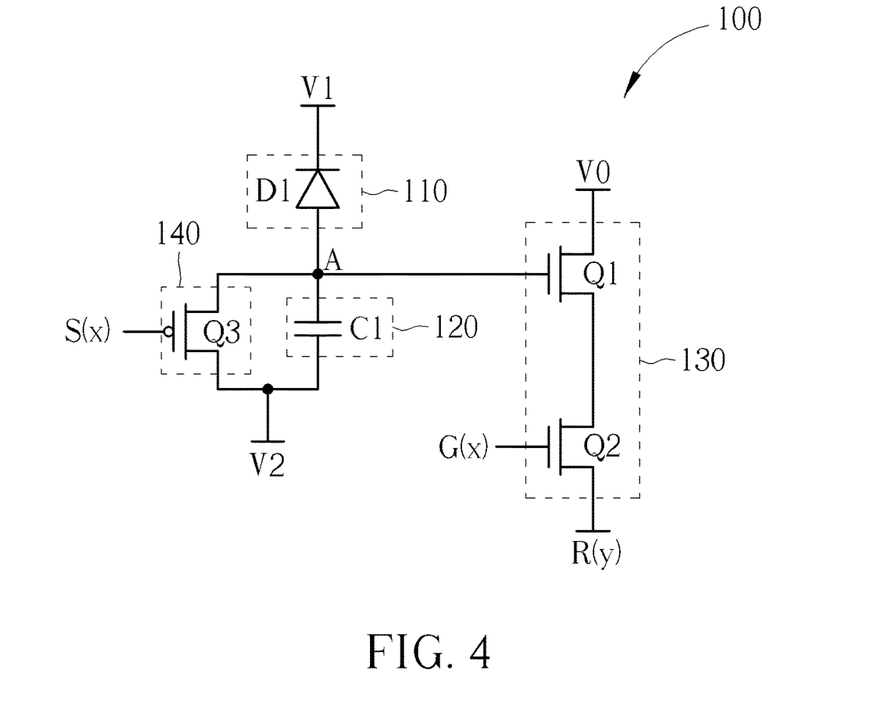
FIGS. 4 to 8 are circuit diagrams of other embodiments of the sensing unit of the electronic device according to the present disclosure.

FIG. 4 is a circuit diagram of another embodiment of the sensing unit 100. In this embodiment, the third switch Q3 is a P-type transistor, and the second switch Q2 is an N-type transistor. The reset signal S(x) received by the gate of the third switch Q3 and the gate signal G(x) are in phase. Since the third switch Q3 and the second switch Q2 are different types of transistors, and the reset signal S(x) and the gate signal G(x) are in phase, the statuses of the third switch Q3 and the second switch Q2 would be opposite to each other. When the third switch Q3 is turned off, the second switch Q2 is turned on. When third switch Q3 is turned on, the second switch Q2 is turned off. In addition, other operations of the sensing unit 100 in FIG. 4 are the same as those of the sensing unit 100 in FIG. 2, so it will not be repeated. It should be noted that, in some embodiments, the third switch Q3 may be an N-type transistor and the second switch Q2 may be a P-type transistor.

Figure 5:
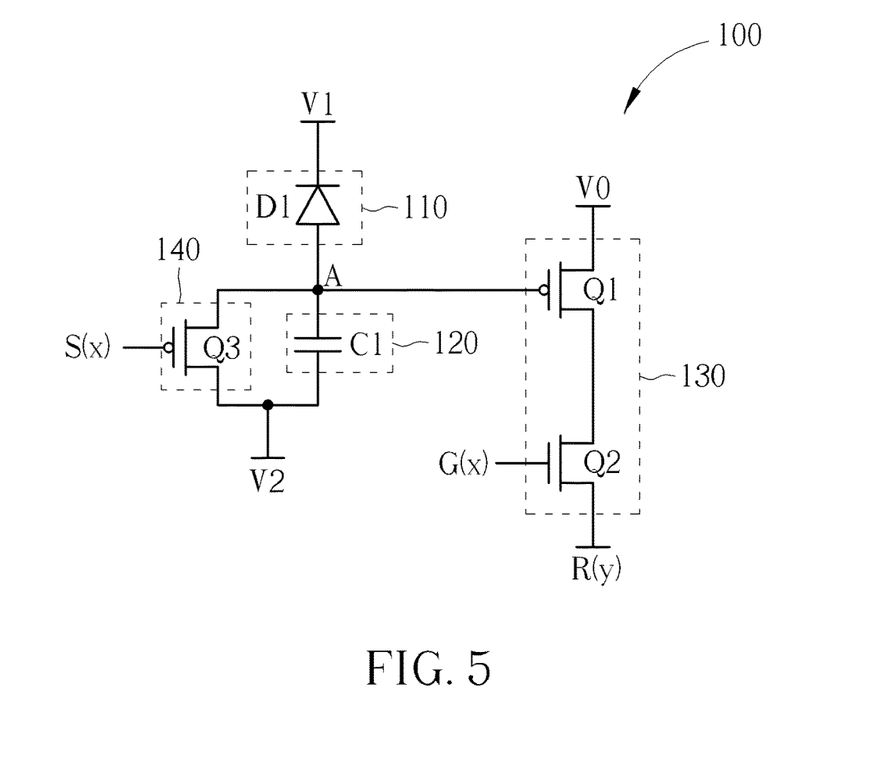

FIG. 5 is a circuit diagram of another embodiment of the sensing unit 100. In the embodiment, the third switch Q3 and the first switch Q1 are P-type transistors, and the second switch Q2 is an N-type transistor. The reset signal S(x) received by the gate of the third switch Q3 and the gate signal G(x) are in phase. Other operations of the sensing unit 100 in FIG. 5 are the same as those of the sensing unit 100 in FIG. 2, so it will not be repeated.

Figure 6:
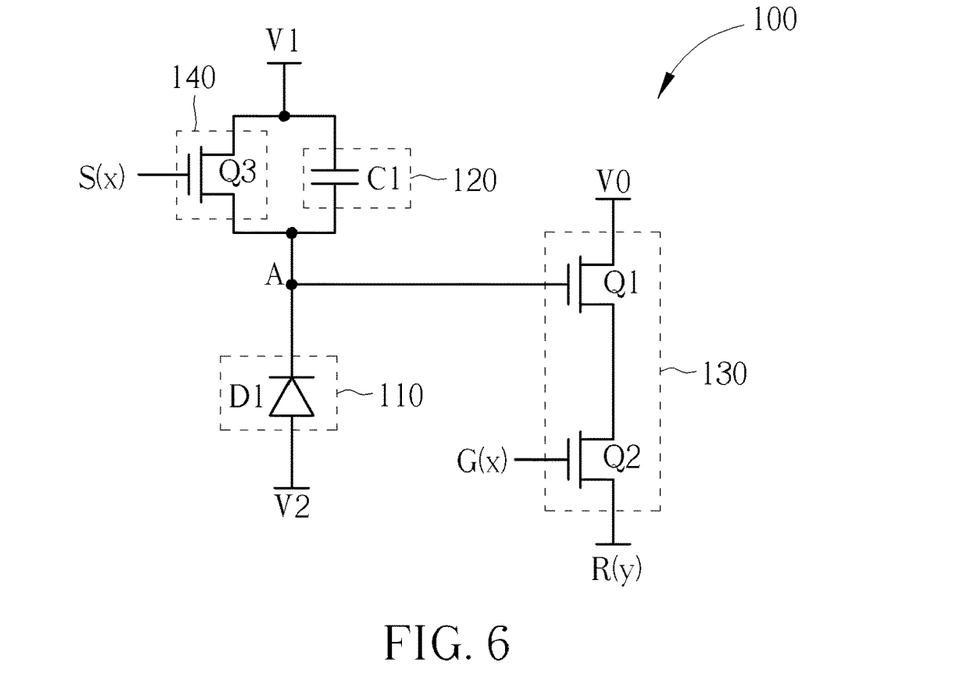

FIG. 6 is a circuit diagram of another embodiment of the sensing unit 100. In the embodiment, the first switch Q1, the second switch Q2, and the third switch Q3 are N-type transistors. The main differences between embodiments in FIG. 6 and FIG. 2 are that the charge storage element 120 and the reset element 140 of the sensing unit 100 in FIG. 6 are coupled between the bias voltage V1 and the node A, and that the photosensitive element 110 is coupled between the node A and the bias voltage V2. When the third switch Q3 is turned on, the voltage level of node A is approximately equal to V1, and the photosensitive element 110 is reverse biased (V2<V1). When the photosensitive element 110 is reverse biased, and the photodiode D1 of the photosensitive element 110 is illuminated, the photodiode D1 generates a current flowing to node A. At this time, the charge storage element 120 would store charges. When the third switch Q3 is turned off due to the reset signal S(x), the second switch Q2 is turned on due to the gate signal G(x) being in antiphase with the reset signal S(x). The first switch Q1 of the signal reading circuit 130 is also turned on due to the voltage level of the node A, and the charges stored by the charge storage element 120 would keep the first switch Q1 turned on. When the first switch Q1 and the second switch Q2 are turned on, a current would flow from the bias voltage V0 through the signal reading circuit 130 as a sensing signal, which would be transmitted to the receiving circuit 40 through the data line R(y).

Figure 7:
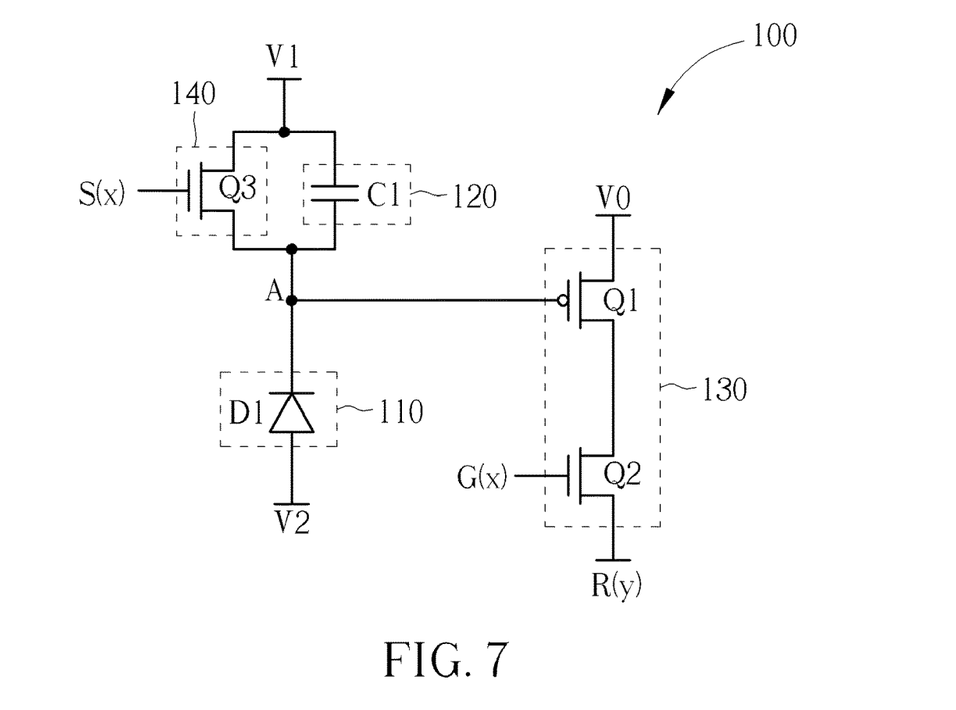

FIG. 7 is a circuit diagram of another embodiment of the sensing unit 100. In the embodiment, the second switch Q2 and the third switch Q3 are N-type transistors respectively, and the first switch Q1 is a P-type transistor. The operations of the sensing unit 100 in FIG. 7 are the same as those of the sensing unit 100 in FIG. 6, so it will not be repeated.

In the embodiments in FIGS. 2, 6 and 7, the reset signal S(x) is transformed from the gate signal G(x) by the not-gate circuit 35 shown in FIG. 1A. Therefore, in the embodiments in FIGS. 2, 6 and 7, the reset signal S(x) and the gate signal G(x) are in antiphase, but they have the same source.

Figure 8:
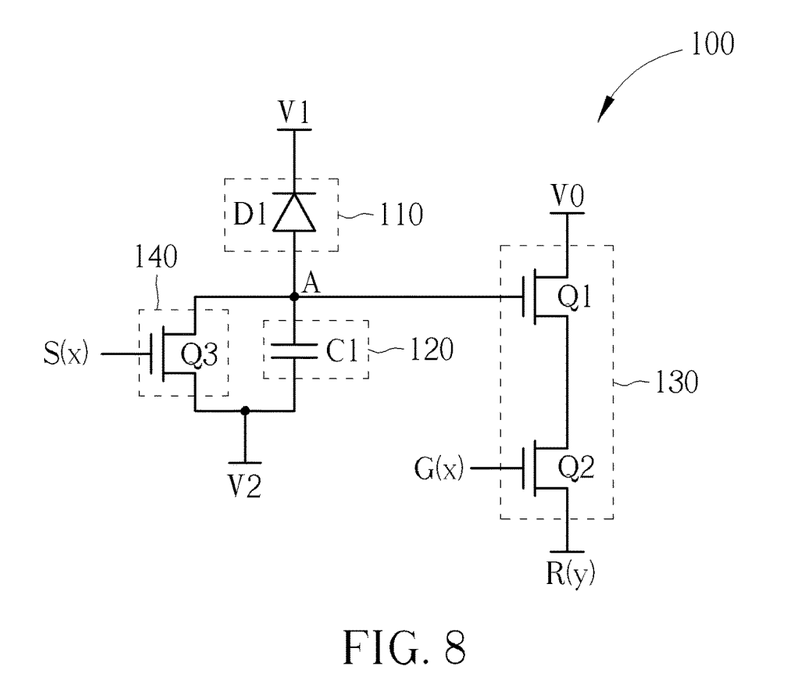
Figure 9:
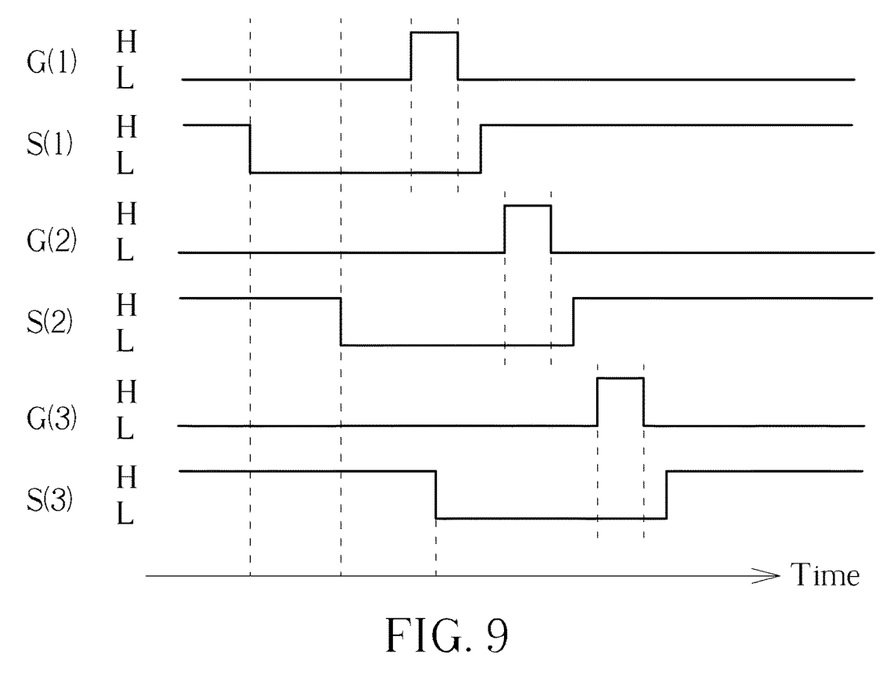
FIG. 9 is another timing diagram of signals received by the sensing unit of the electronic device according to the present disclosure.

FIG. 8 is a circuit diagram of another embodiment of the sensing unit 100. FIG. 9 is another timing diagram of the electronic device of the present disclosure. The structure of the sensing unit 100 in FIG. 8 is substantially the same as that of the sensing unit 100 in FIG. 2. The main difference is that the reset signal S(x) received by the gate of the third switch Q3 in FIG. 8 is generated by the reset circuit 60 shown in FIG. 1B. Therefore, in the embodiment, the electronic device 10 may further comprise the reset circuit 60 for generating the reset signals S(1) to S(m). In addition, the period during which the reset signal S(x) is at a low voltage level may cover the period during which the gate signal G(x) is at a high voltage level, and the reset signal S(x) at the low voltage level and the gate signal G(x) at the high voltage level are in opposite phases. However, this disclosure is not limited thereto. As shown in FIG. 9, the period during which the reset signal S(1) is at the low voltage level will cover the period during which the gate signal G(1) is at the high voltage level; the period during which the reset signal S(2) is at the low voltage level will cover the period during which the gate signal G(2) is at the high voltage level; and the period during which reset signal S(3) is at the low voltage level will cover the period during which gate signal G(3) is at the high voltage level. Therefore, the duration that the second switch Q2 in FIG. 8 is turned on would be shorter than the duration that the third switch Q3 is turned off. However, the present disclosure is not limited thereto.

Figure 10:
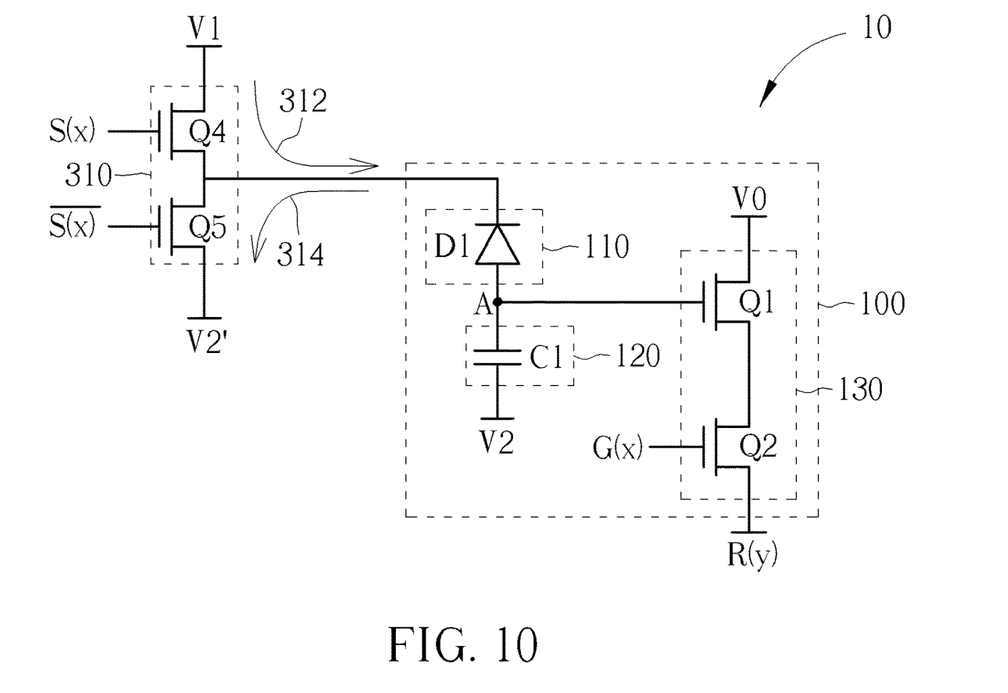
FIGS. 10 to 11 are circuit diagrams of other embodiments of the sensing unit of the electronic device according to the present disclosure.

FIG. 10 is a circuit diagram of another embodiment of the sensing unit 100. The main differences between the sensing unit 100 in FIG. 10 and the sensing unit 100 in FIG. 2 are that the sensing unit 100 in FIG. 10 does not comprise the reset element 140, and that the electronic device 10 in FIG. 10 further comprises a reversion unit 310. The reversion unit 310 comprises a fourth switch Q4 and a fifth switch Q5 coupled to the node A through the photosensitive element 110. In the embodiment, both the fourth switch Q4 and the fifth switch Q5 are N-type transistors, and the gates of the fourth switch Q4 and the fifth switch Q5 respectively receive the reset signal S(x) and an inverted reset signal $\overline{S(x)}$ which is in antiphase with the reset signal S(x). In addition, an electrode of the fourth switch Q4 is coupled to the bias voltage V1, and an electrode of the fifth switch Q5 is coupled to the bias voltage V2'. The bias voltage V2 is greater than the bias voltage V2' and less than V1 (i.e., V2'<V2<V1). Because the reset signal S(x) and the inverted reset signal $\overline{S(x)}$ are in antiphase, the fifth switch Q5 is turned off when the fourth switch Q4 is turned on; and the fifth switch Q5 is turned on when the fourth switch Q4 is turned off. Further, when the fourth switch Q4 is turned on, a charging path 312 is established, such that the photosensitive element 110 would be reverse biased (V2<V1). At this time, the photodiode D1 of the photosensitive element 110 is illuminated to generate a current flowing to the node A to charge the capacitor C1 of the charge storage element 120. When the fifth switch Q5 is turned on, a discharge path 314 is established, which causes the photodiode D1 of the photosensitive element 110 to be forward biased (V2'<V2), and the capacitor C1 of the charge storage element 120 is discharged to reset the voltage level of the node A.

Figure 11:
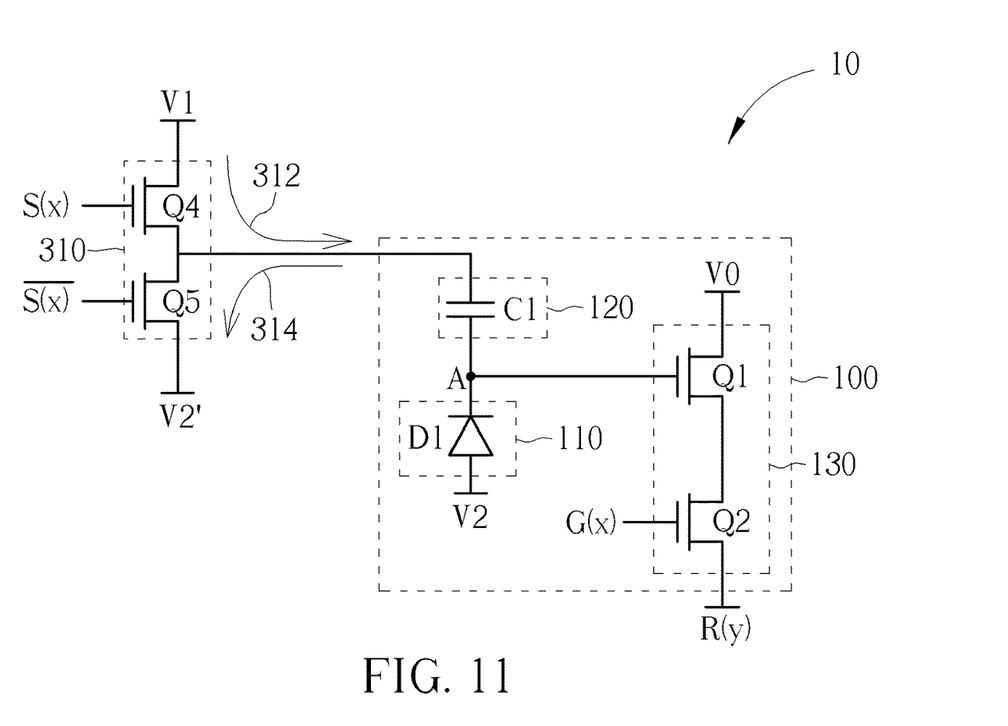

FIG. 11 is a circuit diagram of another embodiment of the electronic device 10. The main difference between the electronic device 10 in FIG. 11 and the electronic device 10 in FIG. 10 is that the positions of the photosensitive element 110 and the charge storage element 120 in FIG. 11 are interchanged as compared to those shown in FIG. 10. Other operations of the electronic device 10 in FIG. 11 are the same as those of the electronic device 10 in FIG. 10, so it will not be repeated here.

The electronic devices according to the present disclosure may be used for optical fingerprint readers as well as various electronic devices (e.g., mobile phones, notebook computers or access control devices) that need to use the fingerprint recognition function for security or other applications. The structure and manufacturing method of the electronic device according to the present disclosure may be applied to a small-area wafer or a large-area glass substrate. The sensing unit array of the electronic device may have a sufficiently large sensing area to effectively capture feature values of a fingerprint. As more feature values are identified, the recognition ability is also improved. In addition, the transistor of the disclosed electronic device may be a thin film transistor. Therefore, in addition to being fabricated on wafers, transistors can also be formed directly on glass, making them more competitive in the market.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:
1. An electronic device comprising:
a photosensitive element;
a charge storage element coupled to the photosensitive element and having a first electrode and a second electrode;
a signal reading circuit coupled to the photosensitive element;
a node coupled between the photosensitive element and the charge storage element;
a fourth switch coupled to the first electrode of the charge storage element; and
a fifth switch coupled to the first electrode of the charge storage element;
wherein the charge storage element is coupled in series with the photosensitive element, and the node is coupled to an end of the signal reading circuit;
wherein the charge storage element is coupled between the photosensitive element and the fourth switch;
wherein when one of the fourth switch and the fifth switch is turned off, another one of the fourth switch and the fifth switch is turned on;
wherein when the fourth switch is turned on, the photosensitive element is reverse biased; and
wherein when the fifth switch is turned on, the photosensitive element is forward biased.

2. The electronic device of claim 1, wherein the signal reading circuit comprises a first switch and a second switch, and the first switch is coupled to the node.

3. The electronic device of claim 1, wherein when the photosensitive element is reverse biased and illuminated, the photosensitive element generates a current.

4. The electronic device of claim 1, further comprising:
a reset circuit coupled to the node; and
a gate circuit coupled to the signal reading circuit.

5. The electronic device of claim 1, wherein the charge storage element is coupled between the photosensitive element and the fifth switch.

6. An electronic device comprising:
a plurality of sensing units, at least one of the plurality of sensing units comprising:
a photosensitive element;
a charge storage element coupled to the photosensitive element and having a first electrode and a second electrode;
a signal reading circuit coupled to the photosensitive element;
a node coupled between the photosensitive element and the charge storage element;
a fourth switch coupled to the first electrode of the charge storage element; and
a fifth switch coupled to the first electrode of the charge storage element;
wherein the charge storage element is coupled in series with the photosensitive element, and the node is coupled to an end of the signal reading circuit;
wherein the charge storage element is coupled between the photosensitive element and the fourth switch;
wherein when one of the fourth switch and the fifth switch is turned off, another one of the fourth switch and the fifth switch is turned on;
wherein when the fourth switch is turned on, the photosensitive element is reverse biased; and
wherein when the fifth switch is turned on, the photosensitive element is forward biased.

7. The electronic device of claim 6, wherein the signal reading circuit comprises a first switch and a second switch, and the first switch is coupled to the node.

8. The electronic device of claim 6, wherein when the photosensitive element is reverse biased and illuminated, the photosensitive element generates a current.

9. The electronic device of claim 6, further comprising:
a reset circuit coupled to the node; and
a gate circuit coupled to the signal reading circuit.

10. The electronic device of claim 6, wherein the charge storage element is coupled between the photosensitive element and the fifth switch.

* * * * *